United States Patent [19]

Markiewitz et al.

[11] 4,188,349
[45] Feb. 12, 1980

[54] PROCESS FOR CURING UNSATURATED POLYESTERS UTILIZING NOVEL INITIATORS

[75] Inventors: Kenneth H. Markiewitz; Alfred J. Restaino, both of Wilmington, Del.

[73] Assignee: ICI Americas Inc., Wilmington, Del.

[21] Appl. No.: 808,778

[22] Filed: Jun. 21, 1977

Related U.S. Application Data

[63] Continuation-in-part of Ser. No. 673,539, Apr. 5, 1976.

[51] Int. Cl.$^2$ .................... C08G 59/02; C08G 59/13; C08F 4/00; C08G 18/04
[52] U.S. Cl. .................... 525/366; 526/209; 526/215; 526/249; 526/250; 526/270; 526/271; 526/292; 526/301; 526/313; 528/75; 528/93; 525/379; 525/386
[58] Field of Search .................... 260/830 R, 835, 836, 260/837; 842, 859 R, 860, 861, 862, 871, 873, 47 UA, 47 A, 47 EQ, 47 C, 47 EN, 75, 77.5 CR, 77.5 R, 864; 528/75, 93; 526/209, 215, 313, 292, 301, 271

[56] References Cited

U.S. PATENT DOCUMENTS

| | | | |
|---|---|---|---|
| 2,331,265 | 10/1943 | Coleman et al. | 260/47 EQ |
| 3,214,491 | 10/1965 | Stanton | 260/871 |
| 3,414,550 | 12/1968 | D'Alelio et al. | 260/2.2 R |
| 3,479,185 | 11/1969 | Chambers | 96/84 |
| 3,821,098 | 6/1974 | Garratt | 526/258 |
| 3,876,726 | 4/1975 | Ford et al. | 260/859 R |
| 4,032,482 | 6/1977 | Moriya et al. | 260/47 EN |

*Primary Examiner*—Herbert J. Lilling
*Attorney, Agent, or Firm*—Han Jolyon Lammers

[57] ABSTRACT

Poly- or vinyl-ester resin compositions containing ethylenic unsaturation and susceptible to free radical polymerization may be further polymerized by contacting the with an initiating compound having the formula:

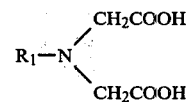

wherein $R_1$ is a substituted or unsubstituted aryl radical.

32 Claims, No Drawings

PROCESS FOR CURING UNSATURATED POLYESTERS UTILIZING NOVEL INITIATORS

HISTORY OF THE INVENTION

This invention is a continuation-in-part of our copending application U.S. Ser. No. 673,539 filed Apr. 5, 1976.

FIELD OF THE INVENTION

This invention concerns the polymerization of ester resin containing ethylenic unsaturation which are susceptible to free radical polymerization. Specifically the invention also concerns novel methods for initiating polymerization of such ester compositions containing inactive initiators which initiators may be activated to polymerize the system.

DESCRIPTION OF THE PRIOR ART

Polymerization of ester resins having ethylenic unsaturation may be initiated by several methods well known in the art. Some of these include the use of high energy electromagnetic radiation such as gamma radiation and x-rays, ultraviolet light radiation, chemical initiators, and thermal means. Many polymerization reactions depend upon the formation of free radicals to cause the initiation of the polymerization. The use of free radical producing agents containing an acetic acid group has been disclosed in Chambers' U.S. Pat. No. 3,479,185. The Chambers patent discloses for example the use of a system of N-phenyl glycine or N,N,N',N',-ethylenediamino tetraacetic acid in combination with a 2,4,5-triphenylimidazolyl dimer as a photo polymerization catalyst.

It has now been discovered however that certain N-substituted aromatic imino diacetic compounds produce free radicals and provide for excellent and versatile initiators without the additional presence of a dimer.

An additional advantage of the initiators of the present invention is their versatility in that they can cause polymerization in presence or absence of air, oxygen, heat, visible or ultraviolet light. While such sources of radiation energies are therefore not required the presence of them as promoters will tend to increase the activity of the initiator and consequently the rate of polymerization.

SUMMARY OF THE INVENTION

According to the invention there is therefore provided a method of polymerizing an ethylenically unsaturated ester resin composition susceptible to free radical polymerization which comprises initiating polymerization by contacting the composition with an effective amount of a dissolved initiator of the formula:

wherein $R_1$ is a substituted or unsubstituted aryl radical provided that the ethylenically unsaturated ester resin composition does not contain "any group with which all the acid groups of the initiator will preferentially react chemically" (as hereinafter defined). According to the invention there is also provided an ethylenically unsaturated ester resin composition susceptible to free radical polymerization which contains an inactive initiator comprising a salt or ester of a dissolved compound of the formula:

wherein $R_1$ is a substituted or unsubstituted aryl radical which salt or ester upon acidification will yield said compound, provided that the ethylenically unsaturated ester does not contain any group with which the acid group of the compound will preferentially react chemically. By aryl is meant a monovalent radical containing an aromatic ring wherein the free valence is on a carbon atom of the aromatic ring.

DESCRIPTION OF THE INVENTION

An important limitation of the process of the invention requires that the initiator must be soluble in at least one phase of a polymerizable resin composition. This polymerizable composition may be an emulsion, suspension or solution. Often the initiator is soluble in the polymerizable resin and no additional solvent is required. Alternatively in a polymerizable composition, where the initiator is not directly soluble in the ester resin, the domposition must comprise a solvent such as for example, water methanol or styrene for the initiator. The term "dissolved initiator" is therefore meant to include initiators dissolved in the polymerizable resins and initiators dissolved in a solvent. By ester resin is meant both vinyl ester or polyester resin. The term polymerization is meant to include such phenomena as cross-linking and curing.

The initiating compounds which are useful in the process of this invention include:

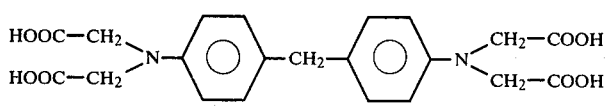

p-methylenedianiline tetraacetic acid

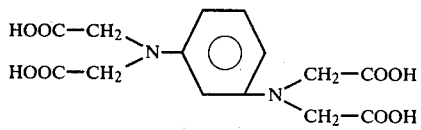

m-phenylenediamine tetraacetic acid

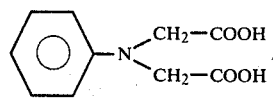

anilinediacetic acid

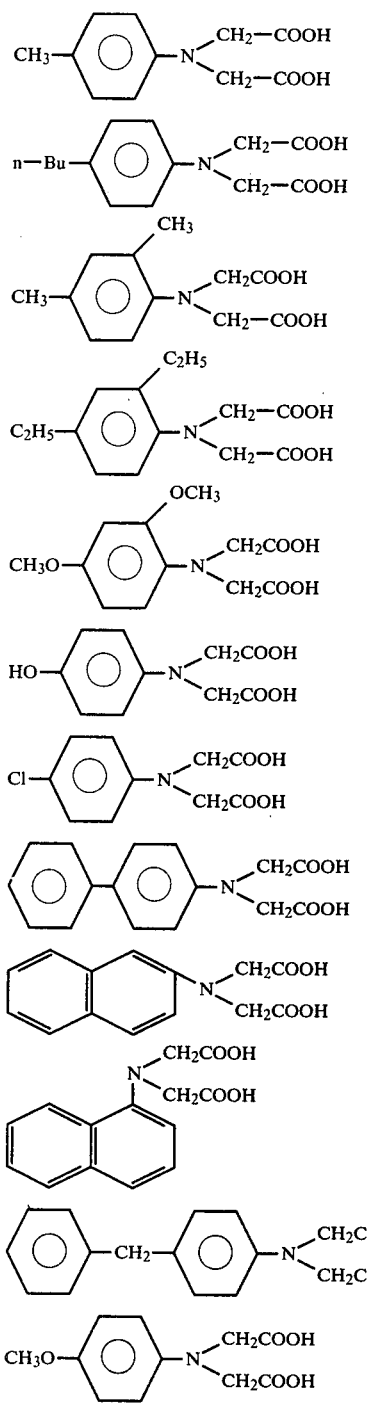

Preferred initiating compounds are those wherein $R_1$ has the following formula:

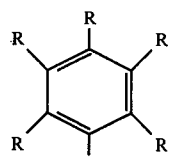

wherein R is hydrogen, alkyl, alkoxy, phenyl, aralkyl, or alkaryl.

-continued p-toluidinediacetic acid p-(n-butyl)anilinediacetic acid 2,4-dimethylanilinediacetic acid 2,4-diethylanilinediacetic acid

[(2,4-dimethoxyphenyl)imino]diacetic acid

[(4-hydroxyphenyl)imino]diacetic acid

[(4-chlorophenyl)imino]diacetic acid

[(1,1'-biphenyl)-4-ylimino]diacetic acid (2-naphthylimino)diacetic acid (1-naphthylimino)diacetic acid

[(4-phenylmethylphenyl)imino]diacetic acid

[(4-methoxyphenyl)imino]diacetic acid

Preferred initiators showing high activity are those containing alkyl or alkoxy substituted aromatic ring group. Other preferred initiators also having high activity are those containing two aromatic rings.

The initiators useful in the process of the invention may be prepared by reacting in an aqueous solution the corresponding amine component with a slight excess of sodium chloroacetate at elevated temperatures. During the reaction, which is usually complete in 2 hours at reflux, the pH of the reaction mixture is carefully controlled at about 7 by the addition of sodium hydroxide. After the reaction is completed the product may usually be obtained as the inactive sodium salt by stripping or alternatively as an active precipitate by acidification such as with hydrochloric acid. In instances where precipitation will not occur after acidification, extraction procedures may be employed to obtain the product.

Ester Composition

The ethylenically unsaturated ester compositions which may be employed in the method of the present invention are in general characterized as ethylenically unsaturated vinyl or polyesters susceptible to free radical polymerization. Useful compositions may also include those containing both vinyl esters and polyester groups.

The polyester compositions are well known and comprise the reaction product of at least one ethylenically unsaturated dicarboxcyclic acid or anhydride and at least one polyol. Such reaction products may have the following formula:

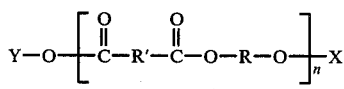

wherein Y is HOR or H and where R is a diol residue.
wherein R' is a group containing ethylenic unsaturation that will undergo vinyl polymerization or vinyl copolymerization.
wherein X is H or

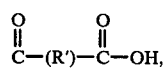

and wherein n is an integer of at least 2.

Illustrative examples of such ethylenically unsaturated dicarboxylic acids and anhydrides which may be used to form the polyester compositions include maleic acid, fumaric acid and maleic anhydride. Exemplary of the polyols which may be used to form the ester resin compositions are aliphatic glycols such as ethylene glycol, diethylene glycol, propylene glycol, dipropylene glycol, butane diol, and hexane diol, trimethylol propane, neopentylglycol, dibromoneopentyl glycol, pentaerythritol, and alkylene oxide ethers of phenols such as 2,2-di(4-hydroxyphenyl)propane; di(4-hydroxyphenyl)methane; 2,2-di(3,5-dibromo-4-hydroxyphenyl) propane; 2,2-di(3-methyl-4-hydroxyphenyl)butane; 4,4'-dihydroxybiphenyl; hydrogenated 2,2'-di(4-hydroxyphenyl)propane; 2,2'-dihydroxybenzophenone; 4,4'-dihydroxydiphenyl ether; 4,4'-dihydroxydiphenyl sulfone; and 4,4'-dihydroxydiphenyl ketone. Mixtures of polyols may be used.

A preferred class of polyols are those represented by the general formula:

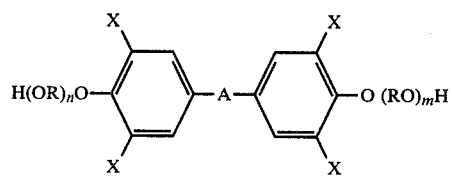

wherein n and m are integers and the sum of n and m is from 2 to 20, A is an alkylene radical having from 1 to 4 carbon atoms, X is H or halogen such as bromine, and R is an alkylene radical having from 2 to 4 carbon atoms.

Polyoxyalkylene ether polyols corresponding to the above formula are disclosed in U.S. Pat. No. 2,331,265, the disclosure of which is incorporated hereinto by reference.

The aforesaid polyester compositions which may be cured in accordance with the present invention may also be prepared by the reaction of a polyol and a mixture of a ethylenically unsaturated dicarboxylic acid and a saturated dicarboxylic acid such as succinic, adipic acid, sebacic, azelaic, glutaric, isophthalic acid, and orthophthalic acid and terephthalic acid; as well as the Diels Alder adduct of hexachlorocyclopentadiene and maleic anhydride (hereinafter HET anhydride). The HET anhydride may be added to water to form HET dibasic acid. Preferably at least about 50% of the dicarboxylic acid moiety of the polyester composition is an ethylenically unsaturated dicarboxycylic acid.

A more detailed description of the polyesters which may be used in accordance with this invention may be found in U.S. Pat. Nos. 2,634,251 and 3,214,491. The disclosures of which are hereby incorporated by reference. In general polyester resin compositions are widely available from a variety of commercial sources and include those commonly referred to as orthophthalic resins, isophthalic resins, terephthalic resins, Hetron resins, Atlac polyester resins, Dion resins and polyester halogenated resins.

Vinyl ester compositions are also useful in the process of the invention and include those made by an addition reaction of an epoxy resin with a carboxylated monomer and may also be further polymerized, cured, or cross-linked in accordance with the present invention.

A preferred class of vinyl esters include the reaction product of two moles of an alpha beta, ethylenically unsaturated acid such as methacrylic or acrylate acid and an epoxy polymer, such as the diglycidyl ether of 2,2-di(4-hydroxyphenol)propane, the diglycidyl ether of 2,2-di(3,5-dibromo,4-hydroxy phenyl)propane, the diglycidyl ether of phenolformaldehyde resins, and higher molecular weight homologues of the above epoxies. Vinyl esters are commercially available from a wide variety of suppliers and include such materials sold under the brand names of Derakane 411, Derakane 511, Derakane 470 and Epocryl 322. Additional vinyl ester compositions which may be cured or polymerized in accordance with this invention include vinyl ester urethane resins of the type disclosed in U.S. Pat. No. 3,876,726 the disclosure of which is hereby incorporated by reference. Further ethylenically unsaturated ester resins useful in the process of the invention are those containing isocyanurate groups such as, for example, those of the type disclosed in U.S. Pat. No. 3,821,098. A preferred class of ester compositions are substantially free of aromatic hydroxyl groups. Mixtures of polyester and vinyl ester resins may also be used.

The initiators of the invention have different effectiveness in different polymerization media, which may be aqueous or organic in nature. Most of the initiators are soluble in organic media. However, in aqueous media the selection of the best initiator is best determined experimentally. In general the least substituted aromatic diacetic acid initiator is water soluble. As groups are substituted on the molecules, initiators may lose water solubility. For example, p-toluidene diacetic acid was found soluble in aqueous solutions where p-(n- octyl) anilinediacetic acid was not found soluble in aqueous media.

The ethylenically unsaturated ester compositions which may be further polymerized according to the method of the invention should not contain any group with which all the acid groups of the initiator will preferentially react chemically. For example, some substituents such as for example, amines, isocyanate or epoxy groups may be highly reactive with the acid groups of the initiator. Such substituents, if present, may therefore derivatise the acid groups to amides or esters. While amine substituents may cause derivation reactions which may be reversible by acidification, substituents such as isocyanate or epoxy groups, may cause irreversible reactions which may permanently diminish or terminate the ability of the initiators to generate free radicals. By the phrase "any group with which all the acid groups of the initiator will preferentially react chemically" is therefore meant any highly reactive groups which will non-reversibly derivatise all the acid groups of the initiator.

As is well known to those skilled in the art, free radical polymerization refers to those polymerization reactions which takes place through intermediates having an odd number of electrons and, consequently, an unpaired electron. It is these intermediates which are generally referred to as free radicals. The free radicals are normally generated in one or more of a variety of ways such as by the decomposition of a chemical initiator added to the polymerizable mixture or by the application of heat or ionizing radiation to the composition. If the free radical is generated in the presence of an ethylenically unsaturated ester composition described above, the radical will add to the double bond with the regeneration of another radical. This radical will, in turn, react with another ethylenic unsaturation and in the course of the reaction generate another free radical resulting in increased crosslinking of the polymer chain. Free radical polymerization is described in detail in, for example, the *Encyclopedia of Polymer Science and Technology*, Vol. 7, pages 361–431, Interscience Publishers, 1967, and in the *Textbook of Polymer Science*, Billmeyer, Interscience Publishers, 1962, pages 262-290.

In addition to increase of crosslinking of the polymer chain, several side reactions can also take place during the course of the polymerization reaction. One of these, identified as chain transfer refers to the transfer of an atom from a molecule to a free radical in the reaction mixture. Depending upon the nature of the other material, this can result in the formation of additional polymer molecules, the formation of branch chain polymers, or in termination of the polymerization reaction on a growing radical chain.

Chain transfer agents do not terminate the polymerization reaction entirely but merely terminate a growing chain and allow the polymerization to start elsewhere. If premature termination of the growing polymer chain occurs, a reduced molecular weight results and other polymer properties are achieved. It is, for this reason, often desirable to include in a free radical polymerization system a chain transfer agent which would function in this manner allowing molecular weight control.

The concentration of the various components utilized in the production of polymer in accordance with the invention may be varied over extremely wide ranges and appears to be not narrowly critical. The concentration of the initiator is dependent on the activity of the initiator used; the type and concentration of other components such as solvent and ester composition; and promoters such as heat and light. Although a concentration range of 0.01% to 2% is economically preferred for optimum conversion, under favorable conditions shown hereafter in the examples, any amounts which are effective may be used, e.g. initiator concentration of as low as 0.006% by weight of ethylenically unsaturation ester compositions and as high as 9% or more by weight may be used successfully. For example in nonaqueous systems the activity of p-toluidine diacetic acid is far greater than an initiator having an unsubstituted aromatic ring such as aniline diacetic acid. Hence the concentration of a greatly active initiator may be less than those of less active initiators. In general in the presence of air, oxygen or other polymerization inhibitor larger amounts of initiator may be required.

The temperatures used in the practice hereof may vary widely and are only limited by the freezing and boiling point of the polymerizable system. In aqueous systems the polymerization may be initiated between about 0° and 100° C. Nonaqueous media such as styrene, or isopropyl methacrylate may allow for polymerization or curing temperatures as high as about 125° C. Other nonaqueous media may allow for polymerization temperature of 200° C. or higher.

The invention does not exclude the utilization of polymerization inhibitors, accelerators and molecular weight modifiers. Any of these may be employed if so desired. Inhibitors may include any free radical scavenger.

The polymerization process according to the invention may occur over a wide range of pH. The optimum pH of the polymerizable system will be affected by the stability of the esters and the solubility and stability of the initiator.

It has also been discovered that the initiators are considerable less active when not substantially in the acid form. The activity of the initiator and thus the rate of polymerization may therefore be regulated by adjustment of pH. As a further advantage, the invention therefore provides for a latent polymerizable system by having the initiators present not in the acid form but as the inactive ester or salt, for example, the inactive sodium salt, or amine salt form. Such a latent system may then be activated by the simple adjustment of pH to a point below the neutralization point of the system. The neutralization point is hereby defined as the pH point of the polymerizable system at which the initiator becomes active due to the presence of acid group. In general the lower the pH of the polymerizable system, the more active the initiator and conversely the higher the pH, the slower the rate of polymerization will be. It should be noted that the neutralization point of the polymerizable system will vary depending on the specific initiator employed.

A particular advantage of a latent polymerizable system is the ability to polymerize, cure or crosslink a liquid polymerizable system containing an inactive initiator at any time in situ merely by the addition of acid to lower the pH of the system. For example, ester compositions and an inactive salt of an initiator may be introduced as a coating into a substrate subsequently polymerized by the introduction of an acid environment to activate the initiator to produce a highly cured polymer coating.

The invention also provides for a polymerizable system containing additionally a second free radical polymerization initiator or catalyst such as a peroxide system to cause postcuring.

The invention is further illustrated by the following examples in which all parts and percentages are by weight unless otherwise specified.

EXAMPLE 1

To 2 g of a polyoxypropylene bisphenol A fumarate resin (commercially available from ICI-US Inc. as ATLAC 382-05 unsaturated polyester resin) was added 0.3 ml of a solution of dimethylaminoethylmethacrylate containing 10 mg of p-n-butylaniline diacetic acid. The acid is presumably present as the amine salt. The sample was illuminated for 1¼ hours with a 300 watt visible light source at a distance of 12". A very slight amount of polymerization occurred. After addition of 300 mg p-toluene sulfonic acid and further illumination, a hard cure occurred within 4 minutes.

EXAMPLE 2

To 2 g of polyoxypropylene bisphenol A fumarate resin (commercially available from ICI-US Inc. as ATLAC 382-05 unsaturated polyester resin) was added 0.3 ml of a solution of dimethylaminoethylacrylate containing 10 mg of p-n-butylaniline diacetic acid. The acid is presumably present as the amine salt. The sample was heated at 60° overnight in the dark. No cure occurred. After addition of 200 mg p-toluene sulfonic acid, the sample cured overnight to a hard solid.

EXAMPLE 3

To 1 g polyoxypropylene bisphenol A fumarate resin (commercially available form ICI-US Inc. as ATLAC 382-05 unsaturated polyester resin) was added 50 mg of dimethyl-p-toluidine diacetate. The sample was illuminated for one hour using a 300 watt visible light source at a distance of 12". No cure occurred. Thereupon, 50 mg p-toluene sulfonic acid to acidify the ester were added, illumination continued, and complete cure occurred within 6 minutes.

EXAMPLE 4

To 2 g of a polyoxypropylene tetrabromo bisphenol A fumarate resin (commercially available from ICI-US Inc. as ATLAC 711-05 unsaturated polyester resin) was added 0.3 ml of a solution of dimethylaminoethylmethacrylate containing 10 mg of p-N-butylaniline diacetic acid. The acid is presumably present as the amine salt. The sample was illuminated for 1¼ hours with a 300 watt visible light source at a distance of 12". A very slight amount of polymerization occurred. After addition of 300 mg p-toluene sulfonic acid and further illumination, a hard cured resin occurs within 10 minutes.

EXAMPLE 5

To 2 g of a low reactive isophthalic polyester resin dissolved in styrene (commercially available from Koppers Inc. as Koppers 1000-25 isophthalic polyester resin) was added 0.3 ml of a solution of dimethylaminoethylmethacrylate containing 10 mg of p-N-butylaniline diacetic acid. The acid is presumably present as the amine salt. The sample was illuminated for 1¼ hours with a 300 watt visible light source at a distance of 12". A very slight amount of polymerization occurred. After addition of 300 mg p-toluene sulfonic acid and further illumination, a hard cure occurred within 15 minutes.

EXAMPLE 6

To 2 g of an unsaturated thermoset resin composed of vinyl maleate urethane resin (commercially available from ICI-US as ATLAC 580-05 resin) was added 0.3 ml of a solution of dimethylaminoethylacrylate containing 10 mg of p-n-butylaniline diacetic acid. The sample was stored in the dark overnight. No cure occurred. After the addition of 200 mg of p-toluene sulfonic acid, the sample cured overnight to a hard solid.

EXAMPLE 7

To 1 g of a vinyl ester resin comprising dimethacrylate of a diglycidylether Bisphenol A dissolved in 55% styrene (commercially available from Dow Chemical Company as Derekane 411-45 resin) was added 50 g of dimethyl-p-toluidine diacetate. The sample was illuminated for one hour using a 300-watt visible light source at a distance of 12". No cure occurred. Thereupon, 50 mg p-toluene sulfonic acid were added, illumination continued, and complete cure occured within 6 minutes.

EXAMPLE 8

To 2 g of a solution of 50 parts styrene and 50 parts of a resin composed of polyoxypropylene Bisphenol A and maleic anhydride (commercially available from ICI-US Inc. as Atlac 382 polyester resin) was added 20 mg of p-n-butylaniline diacetic acid. The sample was heated to 80° C. A clear hard resin resulted indicating curing of the resin had occurred.

EXAMPLE 9

Preparation of m-phenylenediamine tetraacetic acid

Into a three-neck, round bottom (r.b.) flask, equipped with glass stirrer, reflux condenser, thermometer, and addition funnel were placed 32.4 g (0.3 M) m-phenylenediamine dissolved in 300 ml water and 203.1 g sodium chloroacetate in 300 ml water, and 10 drops of a mixed acid/base indicator. The solution was heated to reflux and a solution of 48 g sodium hydroxide in 150 ml water added dropwise so as to maintain the pH between 5 and 8. Reaction was completed within 65 minutes. The reaction mixture was cooled and acidified to pH 1 with 120 ml conc. hydrochloric acid. The formed precipitate was filtered, washed with water at pH=1, and vacuum dried below 40° C. Recovered 49.4 g gray solids (mp=188° C., %N=7.6).

EXAMPLE 10

Preparation of p-(n-butyl)aniline diacetic acid

Into a three-neck r.b. flask, equipped with glass stirrer reflux condenser, thermometer, and addition funnel were placed 29.9 g (0.2 M) p-n-butylaniline; 46.6 g (0.4 M) sodium chloroacetate dissolved in a solution of 200 ml water and 45 ml dioxane and 10 drops of a mixed acid/base indicator. The solution was heated to reflux and a solution of 16 g sodium hydroxide in 64 ml water was added dropwise so as to maintain the pH between 5 and 8 as shown by the indicator. Reaction was completed with 4 hours. The reaction mixture upon dilution with 500 ml water and cooling was acidified with 43 ml conc. hydrochloric acid. The formed precipitate was filtered and washed twice with 200 ml of water at pH 1.3 and dried under vacuum at 40° C. Yield: 41.2 g beige solids (%N=4.9).

EXAMPLE 11

Preparation of dimethyl-p-toluidinediacetate

Into a three-neck r.b. flask, fitted with stirring assembly, thermometer, reflux condenser, and a dropping funnel were placed 10.7 g (0.1 M) p-toluidine, 21.7 g (0.2 M) methylchloroacetate, 50 ml water, and 80 ml dioxane. The solution was heated to reflux and 32 g of an aqueous solution containing 8 g (0.2 M) sodium hydroxide was added dropwise so as to maintain the charge at a neutral pH. Addition was completed within 1½ hours. The flask was cooled to 5° C., and the product was poured into a 4 l. beaker. Upon addition of 3 l. of water, a ppt. formed which was discarded. Extraction of the aqueous phase with chloroform and stripping the extract gave 24.6 g of light-yellow solid.

EXAMPLE 12

Preparation of p-methylenedianilinetetraacetic acid

Into a three-neck r.b. flask, equipped with glass stirrer, reflux condenser, thermometer, and addition funnel were placed 29.7 g. p-methylenedianiline (0.15 M), and 87.3 g sodium chloroacetate (0.75 M) dissolved in 300 ml distilled water and 10 drops of a mixed acid/base indicator. The solution was heated to reflux and 150 ml of an aqueous solution containing 48 g (1.2 M) sodium hydroxide added dropwise at a rate so as to maintain the pH at 6. Reaction was complete within 2½ hours. The reaction mixture was poured into a 4 l. beaker filled with ice water. To this solution were added slowly and with constant very rapid stirring 60 ml concentrated hydrochloric acid solution. Finally, the pH was brought to 1.5 with 1 N hydrochloric acid solution. A precipitate formed. The precipitate was filtered and washed twice with 3½ l. and 1½ l. of cold water whose pH was adjusted to 2. The precipitate was filtered and dried under vacuum, taking care not to heat the precipitate above 35° C. A white powder weighing 62 g was obtained. The product had to be refrigerated in order to reduce its rate of decomposition. (%N=6.04, % Cl=0.15, % water=9.4, % sulfated ash=0.20). If the product was kept refrigerated in the dark it remained stable for more than one month.

EXAMPLE 13

Preparation of p-toluidine diacetic acid

Into a three-neck, r.b. flask, equipped with glass stirrer, reflux condenser, thermometer, and addition funnel were placed 53.5 g p-toluidine (0.5 M), and 116.5 g sodium chloroacetate dissolved in a solution of 200 ml water and 10 drops of a mixed acid/base indicator. The solution was heated to reflux and a solution of 40 g sodium hydroxide in 120 ml water added dropwise so as to maintain the pH between 5 and 8. Reaction was complete within 80 minutes. The reaction mixture upon cooling was acidified with 15 ml of conc. hydrochloric acid solution. The formed precipitate was filtered, washed with water at pH 2, and vacuum dried below 40° C. Yield: 86 g beige solids. (%N=6.0).

EXAMPLE 14

Preparation of the sodium salt of p-(n-butyl)aniline diacetic acid

Into a three-neck r.b. flask, equipped with glass stirrer, reflux condenser, thermometer and addition funnel were placed 29.9 g (0.2 M) p-n-butylaniline; 46.6 g (0.4 M) sodium chloroacetate dissolved in a solution of 200 ml water and 45 ml dioxane and 10 drops of a mixed acid/base indicator. The solution was heated to reflux and a solution of 16 g sodium hydroxide in 64 ml water was added dropwise so as to maintain the pH between 5 and 8 as shown by the indicator. Reaction was completed within 4 hours. The reaction mixture was stripped to dryness to give 50 g of the sodium salt of p-(n-butyl)aniline diacetic acid. Some sodium chloride impurity may be present in the product.

What is claimed is:

1. A method of curing or crosslinking an ethylenically unsaturated ester resin susceptible to free radical polymerization which comprises initiating the curing or crosslinking by contacting the resin with an effective amount of dissolved initiating compound of the formula $R_1$—N—$(CH_2COOH)_2$ where $R_1$ is substituted or unsubstituted aryl radical, provided that the ethylenically unsaturated ester resin does not contain any group with which the acid group of the initiator will preferentially react chemically.

2. A method as claimed in claim 1 wherein the ester resin is present in a solution, suspension or emulsion.

3. A method as claimed in claim 2 wherein the ester resin is present in a styrene solution.

4. A method as claimed in claim 1 wherein $R_1$ is an unsubstituted aryl radical.

5. A method as claimed in claim 1 wherein the initiator compound is anilinediacetic acid.

6. A method as claimed in claim 1 wherein $R_1$ is an alkyl or alkoxy substituted aryl radical.

7. A method as claimed in claim 1 wherein the initiating compound is p-(n-butyl)anilinediacetic acid.

8. A method as claimed in claim 1 wherein the initiating compound is p-toluidinediacetic acid.

9. A method as claimed in claim 1 wherein the initiating compound is 2,4-dimethylanilinediacetic acid.

10. A method as claimed in claim 1 wherein the initiating compound is diiminoaryltetraacetic acid.

11. A method as claimed in claim 10 wherein the initiating compound is m-phenylenediaminetetraacetic acid.

12. A method as claimed in claim 10 wherein the initiating compound is p-methylenedianilinetetraacetic acid.

13. A method as claimed in claim 1 wherein the ester resin is a polyester resin.

14. A method as claimed in claim 1 wherein the resin is contacted by a salt or an ester of the initiating compound which salt or ester upon acidification will yield said compound and which salt or ester is subsequently acidified.

15. A method as claimed in claim 14 wherein said acidification is effected by pH adjustment to within a range of 1–9.

16. A method as claimed in claim 14 wherein the resin is contacted by a salt of the initiating compound.

17. A method as claimed in claim 16 wherein the resin is contacted by an alkali metal salt of the initiating compound.

18. A method as claimed in claim 16 wherein the salt is an amine salt of the initiating compound.

19. A method as claimed in claim 14 wherein the resin is contacted by an ester of the initiating compound.

20. A method as claimed in claim 14 wherein the resin is a polyester resin.

21. A curable or crosslinkable ethylenically unsaturated ester resin composition susceptible to free radical polymerization containing a salt or an ester, which upon acidification will yield a compound of the formula $R_1-N-(CH_2COOCH)_2$ wherein $R_1$ is a substituted or unsubstituted aryl radical which compound is soluble in the composition, provided that the ethylenically unsaturated composition does not contain any group with which the acid groups of the compound will preferentially react chemically.

22. A curable or crosslinkable composition as claimed in claim 21 wherein the compound is anilinediacetic acid.

23. A curable or crosslinkable composition as claimed in claim 21 wherein the compound is p-(n-butyl)anilinediacetic acid.

24. A curable or crosslinkable composition as claimed in claim 21 wherein the dissolved compound is p-toluidinediacetic acid.

25. A curable or crosslinkable composition as claimed in claim 21 wherein the compound is 2,4-dimethylanilinediacetic acid.

26. A curable or crosslinkable composition as claimed in claim 21 wherein the compound is m-phenylenediaminetetraacetic acid.

27. A curable or crosslinkable composition as claimed in claim 21 wherein the compound is p-methylenedianilinetetraacetic acid.

28. A curable or crosslinkable composition as claimed in claim 21 wherein the composition contains an alkali metal salt of the compound.

29. A curable or crosslinkable composition as claimed in claim 21 wherein the composition contains an amine salt of the compound.

30. A curable or crosslinkable composition as claimed in claim 21 wherein the composition contains an ester of the compound.

31. A curable or crosslinkable composition as claimed in claim 21 wherein the ethylenically unsaturated ester resin composition is selected from class consisting of a polyoxypropylene bisphenol A fumarate resin, a polyoxypropylene tetrabromo bisphenol A fumarate resin, a vinyl maleate urethane resin, and a resin containing isocyanurate groups.

32. A curable or crosslinkable composition as claimed in claim 21 wherein the ethylenically unsaturated ester resin composition contains a polyester resin.

* * * * *